United States Patent
Zeng et al.

(10) Patent No.: US 10,396,339 B1
(45) Date of Patent: Aug. 27, 2019

(54) BI-METAL BATTERY TAB

(71) Applicant: Apple Inc., Cupertino, CA (US)

(72) Inventors: Qingcheng Zeng, San Jose, CA (US); Donald G. Dafoe, San Jose, CA (US); Andrew Chu, Cupertino, CA (US); Ashley S. Harvey, Granada Hills, CA (US); Junwei Jiang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 626 days.

(21) Appl. No.: 15/093,675

(22) Filed: Apr. 7, 2016

Related U.S. Application Data

(60) Provisional application No. 62/144,295, filed on Apr. 7, 2015.

(51) Int. Cl.
  *H01M 2/30* (2006.01)
  *H01M 2/26* (2006.01)

(52) U.S. Cl.
  CPC ............... *H01M 2/30* (2013.01); *H01M 2/26* (2013.01); *H01M 2220/30* (2013.01)

(58) Field of Classification Search
  None
  See application file for complete search history.

(56) References Cited

U.S. PATENT DOCUMENTS

| | | | |
|---|---|---|---|
| 5,273,844 A | 12/1993 | Casale et al. | |
| 5,570,273 A * | 10/1996 | Siegel | H01L 23/58 |
| | | | 174/261 |
| 7,462,416 B2 | 12/2008 | Kim | |
| 8,962,178 B2 | 2/2015 | Choi | |
| 2013/0089759 A1 | 4/2013 | Han et al. | |
| 2016/0043448 A1 * | 2/2016 | Fritz | H01M 2/204 |
| | | | 429/90 |

* cited by examiner

*Primary Examiner* — Jonathan Crepeau
*Assistant Examiner* — Angela J Martin
(74) *Attorney, Agent, or Firm* — Robert C. Kowert; Meyertons, Hood, Kivlin, Kowert & Goetzel, P.C.

(57) ABSTRACT

A bi-metal tab includes an internal tab segment that can be coupled to a battery cell terminal within an interior of the cell and an external tab segment that can be coupled to an element external to the cell. One tab segment includes a pin tab segment that comprises a pin, and another tab segment includes a socket tab segment comprised of a separate metal material, that comprises a socket. The socket can be at least partially enclosed, on at least two opposing sides, by the structure of the socket tab segment, and the socket and pin of the separate segments can be configured to couple, to form the tab, where at least two surfaces of the pin are in flush contact with the socket tab segment structure. A protection layer that restricts electronic transport across the tab based on exposure to particular physical conditions can be included between the tab segments.

20 Claims, 7 Drawing Sheets

BI-METAL BATTERY TAB

This application claims priority from U.S. Provisional Application No. 62/144,295, entitled "Bi-Metal Battery Tab" and filed Apr. 7, 2015, the contents of which is incorporated by reference in its entirety herein.

BACKGROUND

Technical Field

The disclosed embodiments relate to batteries configured to provide electrical power. More specifically, the disclosed embodiments relate to bi-metal tabs that can electrically couple one or more terminals of a battery cell to one or more other elements external to the battery cell.

Description of the Related Art

Rechargeable batteries are presently used to provide power to a wide variety of portable electronic devices, including laptop computers, cell phones, PDAs, digital music players and cordless power tools. As these electronic devices become increasingly smaller and more powerful, the batteries that are used to power these devices need to store more energy in a smaller volume.

The most commonly used type of rechargeable battery is a lithium battery, which can include a lithium-ion battery, a lithium-polymer battery, any of various other lithium battery variations, or a combination of the foregoing. Lithium batteries typically contain, among other parts, a cathode current collector, a cathode comprised of an active material, a separator, an anode current collector, and an anode comprised of an active material. The cathode can comprise a cathode coating and the anode can comprise an anode coating.

A battery cell can include a tab that can electrically couple a battery cell to another portion of the battery. For example, where a battery includes multiple battery cells, the terminals of the battery cells can be coupled to a bus bar via separate tabs.

SUMMARY OF EMBODIMENTS

A bi-metal tab that is configured to electrically couple a battery cell terminal to an element external to the battery cell includes an internal tab segment that can be coupled to a battery cell terminal within an interior of the cell and an external tab segment that can be coupled to an element external to the cell. One tab segment includes a pin tab segment that comprises a pin, and another tab segment includes a socket tab segment comprised of a separate metal material, that comprises a socket. The socket can be at least partially enclosed, on at least two opposing sides, by the structure of the socket tab segment, and the socket and pin of the separate segments can be configured to couple, to form the tab, where at least two surfaces of the pin are in flush contact with the socket tab segment structure. A protection layer restricts electronic transport across the tab based on exposure to particular physical conditions can be included between the tab segments.

Some embodiments include an apparatus that further includes a pin tab segment and a socket tab segment that are coupled together via an engagement of a pin included in the pin tab segment with a socket included in the socket tab segment. The socket tab segment includes at least two socket structures that bound opposite sides of the socket, and engaging the pin with the socket includes engaging opposite surfaces of the pin in flush contact with the at least two socket structures. The pin can be configured to be enclosed within the socket when the pin is engaged with the socket. One or more of the pin and the socket can be configured to accommodate at least one protection layer on at least one surface of the at least one of the socket and the pin, so that the tab includes at least one protection layer that is located between the pin tab segment and the socket tab segment and that is configured to at least partially restrict electronic transport between the pin tab segment and the socket tab segment based on exposure to one or more particular physical conditions.

Figure 1:
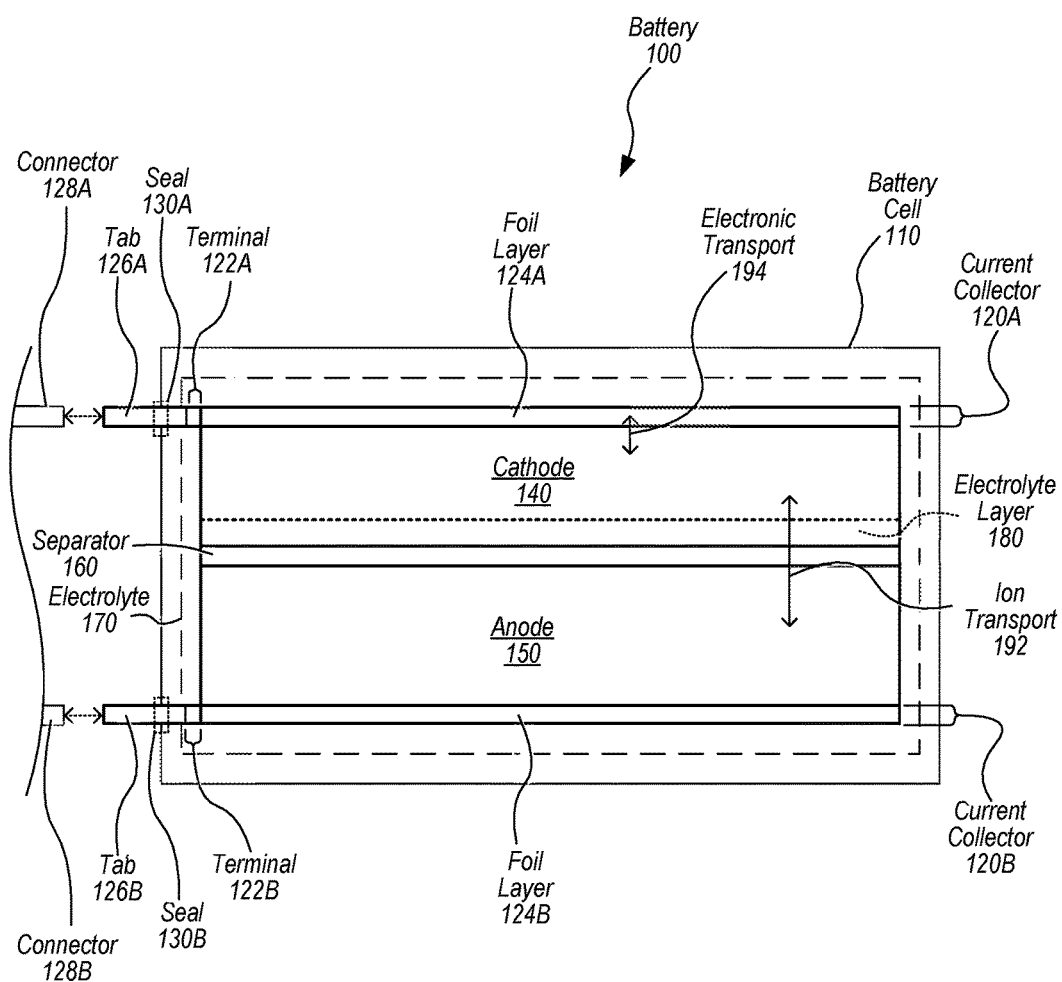
FIG. 1 illustrates a battery that comprises bi-metal tabs that couple battery cell terminals to elements external to a battery cell, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION OF EMBODIMENTS

Various embodiments of an apparatus that includes a bi-metal tab configured to electrically couple a battery cell terminal to an element external to the battery cell are disclosed.

FIG. 1 illustrates a battery that comprises bi-metal tabs that couple battery cell terminals to elements external to a battery cell, according to some embodiments.

The battery 100 shown in FIG. 1 includes a battery cell 110 that includes an anode 150 and cathode 140 and current collectors 120A and 120B coupled to distal surfaces of the electrodes 140, 150 respectively, where the distal surfaces include, on each electrode of electrodes 140, 150, at least one surface that face away from the other electrode of electrodes 140, 150. The battery cell 110 may further include one or more electrolyte substances positioned between the anode 150 and the cathode 140. Battery cell 110 further includes a battery separator layer 160 that separates the two electrodes, and an electrolyte 170 in that at least some of the components of the cell 110 are immersed. The electrolyte 170 can include one or more various liquid electrolytes. In some embodiments, the liquid electrolyte is included in a limited portion of the battery 100, including a limited portion of the cell. For example, the electrolyte 170 can be included in the separator 160 and not in other portions of the cell. In some embodiments, the cell includes one or more electrolyte layers 180 that are located between the electrodes. The electrolyte layer 180 can include a solid electrolyte layer. In some embodiments, the separator 160 is absent from cell 110. Specifically, although shown in FIG. 1 as having both a separator 160 with a liquid electrolyte 170 and a solid electrolyte layer 180, it should be appreciated that at least some of the battery embodiments discussed here may include a separator 160 with liquid electrolyte 170 and no solid electrolyte layer 180, at least some of the battery embodiments discussed here may include a solid electrolyte layer 180 and no separator 160 and liquid electrolyte 170, etc.

A battery cell 110 can include at least one cathode 140, anode 150, and electrolyte 170, 180 that are comprised of various materials. In some embodiments, a battery cell 110 includes a cathode 140 that is comprised of one or more various metal oxides. The battery cell 110 can include electrolytes in one or more various phases. For example, a battery 100 that includes a lithium battery can include a liquid electrolyte 170 that can include one or more various lithium salts in an organic solvent. In some embodiments, a battery 100 that can include a lithium battery, includes an electrolyte layer 180, in one or more cells 110 that includes a molten salt layer. In another example, a battery 100 that can include a lithium battery, can include one or more solid electrolyte layers 180 that can include lithium phosphorous oxynitride ("LiPON") that can be mixed with one or more various binder substances that can include one or more of polyvinylidene fluoride (PVDF), carboxymethyl cellulose (CMC), one or more Acrylic substances, etc. A solid electrolyte can form a layer in a battery cell between the electrodes 140, 150 of the battery cell 110. In some embodiments, a battery cell 110 includes at least one liquid electrolyte and at least one solid electrolyte.

In some embodiments, battery cell 110 includes a separator 160 that comprises an at least partially permeable structure that permits the transport of at least some charge carriers, including one or more ions, between the electrodes 140, 150 of the cell 110. In some embodiments, the battery cell 110 is a lithium ion battery cell that comprises a separator 160 that permits the transport 192 of lithium ions between the electrodes 140, 150 of the cell 110. In some embodiments, the separator 160 includes one or more pores via that one or more charge carriers can pass. In some embodiments, the separator comprises a polymer separator. In some embodiments, the separator 160 is configured to inhibit the charge carrier transport between the electrodes based at least in part upon a temperature to that the separator 160 is exposed. Exposure of a component, including one or more layers, of a battery cell to one or more conditions can include the component having that condition; for example, exposure of the separator 160 to a particular temperature can be referred to as at least one portion of the separator 160 being at the particular temperature, the particular temperature being the temperature of the separator 160, etc. A separator 160 can be referred to as a "shutdown separator", because, by forming an impermeable structure and inhibiting ion transport 192 based on temperature, the separator 160 is configured to shut down the battery cell 110 in response to the battery temperature exceeding a certain temperature. As a result, in addition to keeping the electrodes separated, the separator 160 mitigates safety hazards associated with operation of the battery 100. Such a configuration can be associated with the physical structure and composition of the separator. For example, a shutdown separator can be at least partially comprised of one or more polymer materials, including polyethylene, that can melt in response to the local temperature exceeding a threshold, where the melted material coats one or more portions of the separator with a nonconductive layer that inhibits charge carrier transport across the separator, and thus inhibits charge carrier transport between the electrodes.

In some embodiments, a battery 100 comprises a lithium battery 100 that is independent of any battery separator 160. For example, battery cell 110 can include an electrolyte layer 180 that can include a layer including a solid electrolyte material and does not include a separator 160 between the electrodes 140, 150. In some embodiments, battery cell 110 includes a liquid electrolyte 170 that is included within one or more other portions of the battery, including one or more electrodes, such that the liquid electrolyte 170 enables ion transport 192 between a solid electrolyte layer 180 and one or more other portions of the battery. For example, where layer 180 is a solid electrolyte layer, cathode 140 can comprise a porous structure in that a liquid electrolyte 170 is included, where the liquid electrolyte 170 can enable ion transport 192 between the solid electrolyte layer 180 and the cathode 140.

In some embodiments, the anode 150 of one or more battery cells 110 is comprised of one or more materials that include lithium metal. For example, the anode 150 can be comprised entirely of lithium metal.

Current collectors 120A and 120B shown in FIG. 1 each include a foil layer 124A or 124B coupled to an electrode, an electric terminal 122A or 122B coupled to the respective foil layer 124A or 124B, and a tab 126A or 126B that is coupled to the respective terminal 122A or 122B. Each tab 126 can couple with one or more elements external to the battery cell 110, including portions of the battery 100 that are external to the cell 110. As shown, each tab 126A or 126B can be coupled to a separate connector 128A or 128B of an external element. In some embodiments, the connectors 128A and 128B are included in one or more bus bars. Coupling a tab 126 to a connector 128 can include electrically coupling at least the terminal 122, via the tab 126, to the connector 128. As a result, coupling tabs 126A and 126B with connectors 128A and 128B can result in facilitating electronic transport between cell 110 and one or more external elements via one or more of the tabs 126A and 126B.

As shown, cell 110 includes seals 130A and 130B that are each coupled to a separate tab 126A or 126B and are each configured to isolate an interior of the cell 110 from an exterior of the cell 110. A seal 130 is configured to seal off a portion of the cell exterior 110 through which a tab 126 extends, thereby isolating the cell 110 interior from the exterior and mitigating transfer of internal cell 110 components, including electrolyte 170 substances, through a portion of the cell 110 exterior through which the tab 126 extends.

In some embodiments, a tab 126A or 126B is comprised of one or more various materials that are configured to conduct electricity, thereby enabling electronic transport across the tab. The one or more various materials can include one or more metal materials. For example, a tab 126 can be comprised of one or more of aluminum, copper, nickel, iron, tin, titanium, any other known metallic composition, etc. In some embodiments, a tab comprises one or more of a laminated material, an alloy material, etc.

Current collectors 120A and 120B each comprise a respective foil layer 124. A foil layer can facilitate electron transport, also referred to herein as electronic transport 194, between an electrode and an electric terminal. A foil layer can extend over some or all of a surface of an electrode, thereby enabling an increased uniformity in electronic transport across the surface of the electrode. For example, foil layer 124A in FIG. 1 extends over a surface of cathode 140 and facilitates electronic transport between the cathode 140 and the terminal 122A of the current collector 120A. The foil layer 124A can be comprised of a conductive material, including one or more metallic substances that conducts electrical power between the cathode 140 and the terminal 122A.

In some embodiments, a foil layer, to be "coupled" to an electrode layer, is applied to the electrode layer. Applying a layer can be referred to herein interchangeably as adhering a layer, and one or more substances can be applied to a foil layer to facilitate adhesion of a foil layer to an applied electrode layer. For example, a given surface of a foil layer can be coated with a layer of carbon black and applied to an electrode layer, where the carbon black material augments adhesion of the foil layer to the electrode layer.

In some embodiments, coupling a foil layer to an electrode layer includes application of the electrode layer to the foil layer, such that the foil layer is a substrate upon that at least a portion of the electrode layer is applied. Applying a layer can be referred to herein interchangeably as adhering a layer, and one or more substances can be applied to a foil layer to facilitate adhesion of a foil layer to an applied electrode layer. For example, a given surface of a foil layer can be coated with a layer of carbon black and an electrode layer can be applied to the carbon black layer, where the carbon black material augments adhesion of the foil layer to the electrode layer.

In some embodiments, a tab that can be coupled to a terminal of a battery cell and can couple the terminal to an element that is external to the cell is comprised of multiple separate metal materials. The tab can be comprised of separate tab segments that are coupled together and that are each comprised of a separate metal material. One or more of the metal materials, referred to herein as internal metal materials, can be configured to be in contact with one or more components of the battery cell interior, and one or more separate metal materials, referred to herein as external metal materials, included in the tab can be configured to be in contact with one or more elements external to the battery cell.

For example, a tab can be comprised of a particular tab segment that is comprised of an internal metal material and a separate segment that is comprised of an external metal material. The particular segment that is comprised of an internal metal material can be referred to herein as the internal tab segment, and the separate segment that is comprised of an external metal material can be referred to herein as the external tab segment.

The internal metal material can be configured to resist reaction with various components within a battery cell. For example, the internal tab segment can be comprised of an internal metal material that is chemically neutral, inert, etc. with regard to one or more electrolyte substances included within the interior of the battery cell. As a result, the internal tab segment, when located at least partially within the interior of the battery cell, is resistant to damage resulting from exposure to internal battery cell components. In another example, the external tab segment can be comprised of an external metal material that may be at least partially reactive with regard to one or more components of the battery cell interior, including one or more electrolyte substances included therein. The external metal material can be less expensive than the internal metal material, more conductive, etc. As a result, the external metal material can be advantageous to include in portions of a tab that are exposed to an exterior of the battery cell, as reduced usage of internal metal material may be advantageous through reducing a cost of the cell.

A tab that includes two separate segments, comprised of separate ones of an internal metal material or an external metal material, is referred to herein as a bi-metal tab. In some embodiments, the internal tab segment is comprised of an internal metal material that includes one or more of nickel, copper, etc. In some embodiments, the external tab segment is comprised of an external metal material that includes one or more of aluminum.

In some embodiments, the separate tab segments included in a bi-metal tab are coupled together to form the bi-metal tab. Separate tab segments can be coupled via one or more various metal segment bonding techniques known in the art, including one or more of laminating separate tab segments together, press-fitting separate segments together, bonding separate segments together, etc. In some embodiments, separate tab segments are coupled together at corresponding flush cross sections, resulting in a contact area between the two tab segments that approximately corresponds to a cross-sectional area of the tab. In some embodiments, the separate tab segments each include complementary ends that are angled, resulting in a contact area that is greater than the tab cross section when the tab segments are coupled together. Increased contact area between the metal materials of the separate tab segments can augment performance of a tab, based at least in part upon reduced resistance of conduction between the separate tab segments that can result from increased contact area and increased mechanical strength of the joint between tab segments.

In some embodiments, a bi-metal tab comprises two separate segments that are configured to couple in a pin and socket configuration, where one tab segment comprises a pin structure and another tab segment comprises a socket structure and where the pin structure and the socket structure are configured to engage in a complete fit. As referred to herein, a complete fit between a pin structure and a socket structure includes the pin being coupled to the socket so that the pin substantially encompasses the volume of the socket and the surfaces of the pin are substantially in contact with the surfaces of the socket. As referred to herein, substantially encompassing the volume of the socket can include encompassing the volume of the socket to the extent permitted by the fabrication tolerances of components and processes via that the pin and socket structures are fabricated.

In some embodiments, a bi-metal tab that comprises a pin tab segment and a socket tab segment can include an increased contact area between the separate segments when the pin tab segment is coupled to the socket tab segment, thereby providing reduced resistance of electrical conduction between the separate tab segments and thus reduced resistance of the tab to electrical conduction, relative to other tabs having less contact area between separate tab segments. As referred to herein, coupling the pin tab segment with the socket tab segment can include engaging a pin structure of the pin tab segment into a socket of the socket tab segment that results in a complete fit between the pin structure and the socket. Such engaging can include inserting the pin structure into the socket, slidably engaging the pin structure into the socket, some combination thereof, etc. In some embodiments, the socket tab segment comprises the internal tab segment and is comprised of an internal metal material, and the pin tab segment comprises the external tab segment and is comprised of an external metal material. In some embodiments, the socket tab segment comprises the external tab segment and is comprised of an external metal material, and the pin tab segment comprises the internal tab segment and is comprised of an internal metal material.

In some embodiments, the pin and socket configuration of the tab segments provides augmented physical strength of the tab when the segments are coupled together, relative to a tab that comprises separate tab segments coupled via a plane of contact, including a coupling of cross sections, angled planes, etc. Because the pin structure is bounded by at least a portion of the socket structure, the resulting tab can be more resistant to shear forces than a tab formed from coupling cross sections, planes, etc. of separate tab segments. In addition, where a pin tab segment is comprised of external metal material and is at least partially bounded by the socket structure of the socket tab segment when the pin tab segment is coupled with the socket tab segment, at least a portion of the internal metal material can be located within the interior of the battery cell, as the socket tab segment material can preclude the internal metal material from being exposed to internal battery cell components, thereby enabling a reduced amount of the tab being located external to the cell and enabling reduced utilization of internal metal material, as the internal tab segment can be a sheath for the internal metal material located within the battery cell interior rather than comprising a partial, majority, entirety, etc. fraction of the tab.

Figure 2A:
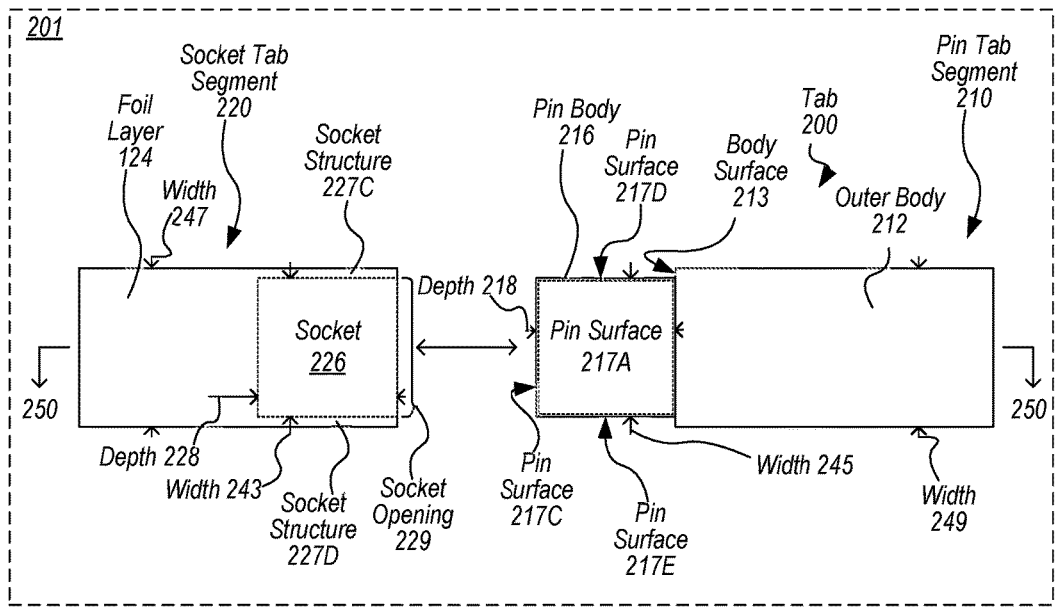
FIGS. 2A and 2B illustrate orthogonal views of a bi-metal tab that comprises a pin tab segment and a socket tab segment that are configured to be coupled together via engagement of a pin structure of the pin tab segment with a socket of the socket tab segment, according to some embodiments.
Figure 2B:
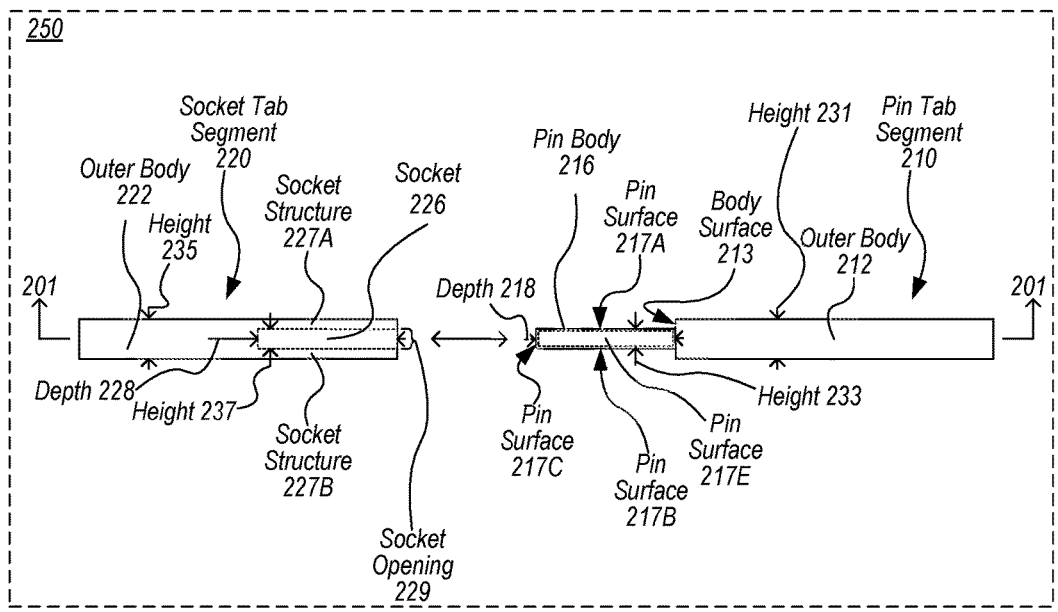

FIGS. 2A and 2B illustrate orthogonal views of a bi-metal tab 200 that comprises a pin tab segment 210 and a socket tab segment 220 that are configured to be coupled together via engaging a pin structure of the pin tab segment with a socket of the socket tab segment, according to some embodiments. Engaging the pin structure with the socket can include engaging the pin structure and the socket in a complete fit. A coupling of a pin tab segment and a socket tab segment that includes engaging the pin structure in the socket can be referred to herein as a pin-socket interlock.

FIGS. 2A and 2B illustrate orthogonal views 201, 250 of the separate segments 210, 220 comprising the tab 200 in a configuration where the separate segments 210, 220 are in a decoupled configuration. The tab 200 illustrated in FIGS. 2A and 2B can be included in any of the embodiments of a bi-metal tab herein, including one or more of the tabs 126A and 126B illustrated in FIG. 1.

Pin tab segment, 210, also referred to herein as a "pin segment", includes an outer body 212 that has a certain width 249 and height 231 and a pin structure 216, also referred to herein as a "pin", that protrudes outward from one end of the outer body 212 to a depth 218 and has a certain width 245 and height 233. In some embodiments, including the illustrated embodiment shown in FIGS. 2A and 2B, one or more of the width 245 and height 233 of the pin 216 is less than that of the corresponding width 249 and height 231 of the outer body 212. The pin 216 can be spaced inward, in at least one dimension, from at least two opposing surfaces of the outer body 212, so that a body surface 213 is present adjacent to opposite surfaces of the pin 216 and the opposite surfaces of the pin 216 are not flush with the corresponding opposite surfaces of the outer body 212. For example, as shown in the illustrated embodiment, a body surface 213 is present adjacent to opposite pin surfaces 217A and 217B and 217C and 217D and none of the surfaces 217 of the pin 216 are flush with the surfaces of the outer body 212.

Socket tab segment, 220, also referred to herein as a "socket segment", includes an outer body 222 that has a certain width 247 and height 235 and a socket 226 that protrudes inward into the interior of the segment 220 from one end of the outer body 22 to a depth 228 and has a certain width 243 and height 237. In some embodiments, including the illustrated embodiment shown in FIGS. 2A and 2B, one or more of the width 243 and height 237 of the socket 226 is less than that of the corresponding width 247 and height 235 of the outer body 222, that results in at least a portion of the socket 226 being bounded by one or more socket structures of the segment 220. The socket structures 227 that bound one or more portions of the socket can be referred to herein as "socket walls". In the illustrated embodiment, the width 243 and height 237 of socket 226 is less than the width 247 and height 235 of the outer body 222, so the socket 226 is bounded by socket structures 227A-227D that collectively bound the width and the height of the socket. The socket 226 has an opening 229 in the segment 220 that is unbounded by socket structure. In some embodiments, the socket 226 is bounded on opposite sides by two or more socket walls. For example, in the illustrated embodiment, socket 226 is bounded on opposite sides by opposite walls 227A and 227B and is further bounded on opposite sides by opposite walls 227C and 227D.

In some embodiments, one or more of the pin 216 and the socket 226 is configured to establish a complete fit with one or more of the socket 226 and the pin 216 when the pin 216 is engaged with the socket 226. In the illustrated embodiment, both the socket 226 and the pin 216 are configured to establish a complete fit with each other when the pin 216 is engaged into the socket 226 via socket opening 229. For example, the height 223, depth 218, and width 245 of pin 216 can match, within fabrication tolerances, the height 237, depth 228, and width 243 of socket 226, so that, when pin 216 is engaged into socket 226, the pin surfaces 217A-E of pin 216 can each be in flush contact with a corresponding portion of the socket tab segment that bounds a corresponding portion of the socket. For example, pin surfaces 217A, 217B, 217D, and 217E can be configured to be in flush contact with socket walls 227A-D when pin 216 is engaged in a complete fit with socket 226, thereby providing contact area for electrical conduction, also referred to herein as electronic transport, through an entirety of the pin surfaces 217A-E and corresponding socket surfaces. Engaging in a complete fit between the pin 216 and the socket 226 can result in the outer bodies 212 and 222 of the separate segments 210 and 220, establishing a flush exterior fit between the segments.

In some embodiments, one or more of the socket 226 and the pin 216 are configured to engage in an incomplete fit. For example, the depth 228 of the socket 226 can be greater than the depth 218 of the pin, such that engaging pin 216 into socket 226 results in pin surfaces 217A, 217B, 217D, and 217E being in flush contact with the respective sockets walls 227A-D and pin surface 217C being exposed to a gap space between the pin surface 217 and a portion of the outer body 222 that bounds the portion of the socket that is distal from opening 229.

Figure 3A:
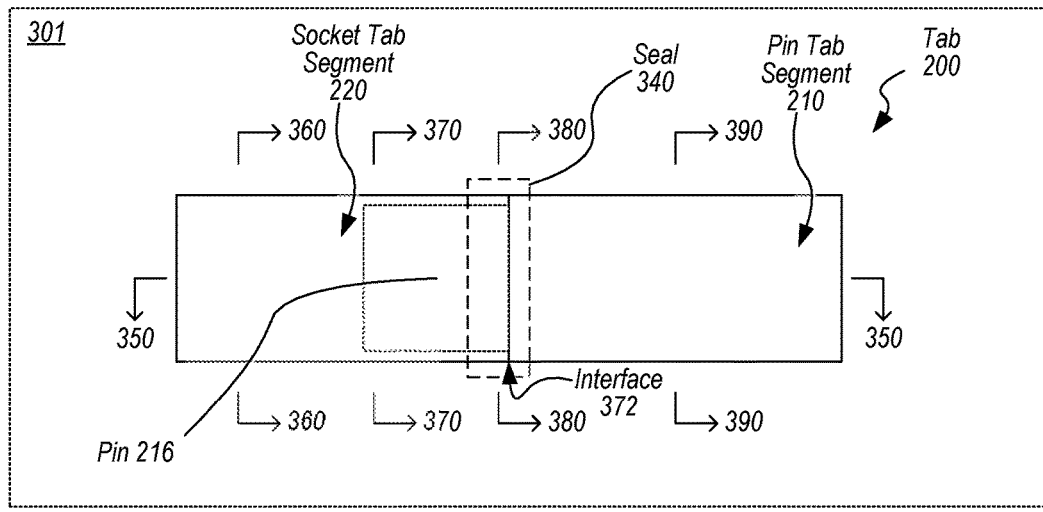
FIGS. 3A and 3B illustrate orthogonal views of a bi-metal tab, where the separate segments comprising the tab are coupled, in a complete fit of the socket and pin established via engaging the pin with the socket, to form the tab, according to some embodiments.
Figure 3B:
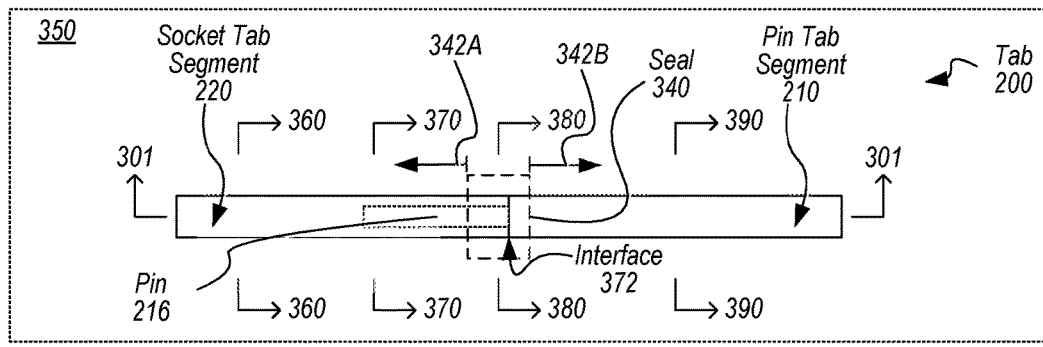

FIGS. 3A and 3B illustrate orthogonal views 301, 350 of the tab 200, where the separate segments 210, 220 comprising the tab 200 are coupled, in a complete fit of the socket 226 and pin 216 established via engaging the pin 216 with the socket 226, to form the tab 200, according to some embodiments. FIGS. 4A-4D illustrate cross sections 360, 370, 380, 390 of the tab 200 comprising the coupled segments 210, 220, according to some embodiments. The tab 200 illustrated in FIGS. 3A and 3B and 4A-4D can be included in any of the embodiments of a bi-metal tab herein, including one or more of the tabs 126A and 126B illustrated in FIG. 1.

Figure 4A:
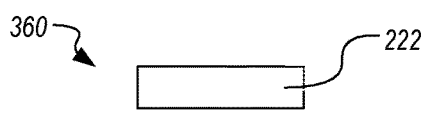
FIGS. 4A-D illustrate cross sections of a tab comprising the coupled pin tab segments and socket tab segments, according to some embodiments.
Figure 4B:
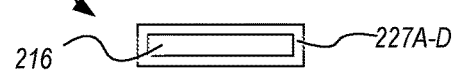
Figure 4C:
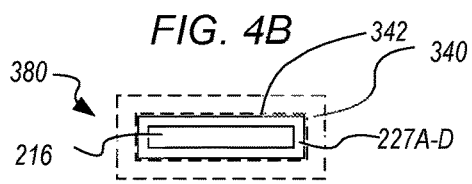
Figure 4D:
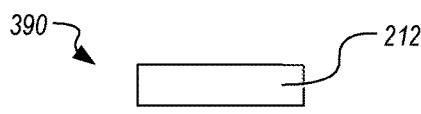

As shown in FIGS. 3A and 4C-4D, the segments 210, 220 are coupled together, via engagement of the pin 216 of segment 210 into the socket 226 of segment 220, forming a complete fit of the pin 216 within the socket 226, so that the pin 216 is in flush contact with the socket walls 227A-227D that bound the socket 226. As shown, the coupled segments 210, 220 establish a flush coupling of the exterior surfaces of the segment 210, 220, so that the tab 200 formed from the coupling of the segment 210, 220 includes a flush exterior at the interface 372 between the segments.

As shown in FIGS. 3A and 3B, a seal 340 can be coupled to the tab 200 and can partition the exterior of the tab 200 into two isolated portions 342A and 342B located on opposite sides of the seal 340. As shown in FIG. 4C, the seal can comprise a cylindrical structure through which the tab 200 can fit, where the interior of the seal structure is in contact with the exterior surface of the tab 200. Coupling the seal to the tab can include sliding the tab 200 through the interior 342 of the seal structure 340 and positioning the tab 200 in a particular configuration, with regard to the portion of the tab 200 enclosed by seal 340, which results in a partitioning of the tab 200 exterior surface into two separate portions 342A and 342B where at least one portion 342 includes an exposed exterior that is exclusively an exposed exterior of the external tab segment of segments 210, 220. In some embodiments, the other portion 342, which does not include an exposed exterior that is exclusively an exposed exterior of the external tab segment, can include exposed exteriors of both the external tab segment and the internal tab segment. In the illustrated embodiment, the seal 340 is coupled to a portion of the tab 200 in a particular configuration that results in the seal 340 isolating the external interface 372 of the segments 210, 220 from being included in the exposed exterior of the tab in either portion 342A or 342B.

In addition, the illustrated configuration of seal 340 results in the exposed surfaces included in portion 342A being restricted to exterior surfaces of socket tab segment 220 and the exposed surfaces included in portion 342B being restricted to exterior surfaces of pin tab segment 210. As a result, where one of the pin tab segment 210 or the socket tab segment 220 comprises an external tab segment and the other segment comprises an internal tab segment, one of the portions 342A or 342B that includes exposed surfaces exclusively of an interior tab segment is configured to be included within an interior of a battery cell, thereby precluding the other portion 342A or 342B, that includes at least exposed surfaces of an exterior tab segment, from exposure to interior components of the battery cell with that the internal metal material comprising the internal tab segment may react.

In some embodiments, the pin tab segment 210 is the internal tab segment, such that portion 342B is configured to be included in an interior of a battery cell, where body 212 can be coupled to a terminal included in the interior of the battery cell, and the exposed surfaces of the exterior tab segment in portion 342A are configured to be isolated from exposure to the interior of the cell via seal 340. In some embodiments, the pin tab segment 210 is the external tab segment, such that portion 342A is configured to be included in an interior of a battery cell, where body 222 can be coupled to a terminal included in the interior of the battery cell, and the exposed surfaces of the exterior tab segment in portion 342B are configured to be isolated from exposure to the interior of the cell via seal 340. In addition, where the pin tab segment 210 is the internal tab segment, the pin structure 216 can be located within the portion 342A of the tab 200 that can be located within the volume of the interior of the battery cell, as the pin 216 is isolated from exposure to the interior of the battery cell via the socket walls 227 bounding the socket 226. In addition, as noted above, the seal 240 can isolate the interface 372 between the segments 210, 220 from exposure to the interior of the cell.

In some embodiments, a battery includes a particular layer included in a bi-metal tab that at least partially restricts electronic transport through one or more battery cells, between a battery cell and an external environment, etc. based on exposure to one or more physical conditions within at least the particular layer. Such a layer is referred to herein as a "protection layer". As referred to herein, a "protection layer" can be referred to interchangeably as a "functional layer", a "protection layer material" comprised in the protection layer can be referred to as a "functional layer material", and a "protection material" included in the protection layer can be referred to as a "functional material". A battery cell can include one or more bi-metal tabs that include one or more various protection layers that are configured to restrict electronic transport between separate portion of the bi-metal tab, thereby restricting operation (e.g., charging, discharging) of the battery cell under certain conditions.

Figure 5A:
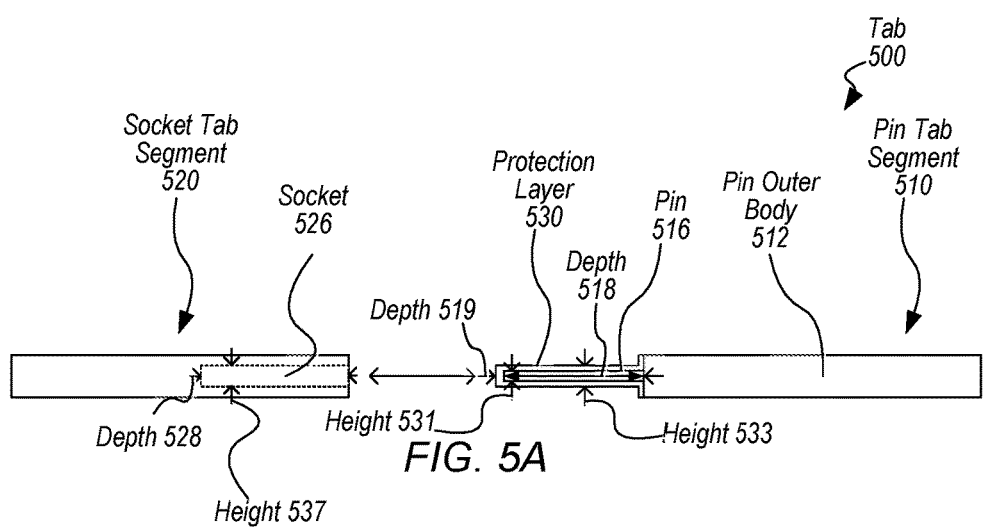
FIGS. 5A and 5B illustrate a bi-metal tab that includes a protection layer, according to some embodiments.
Figure 5B:
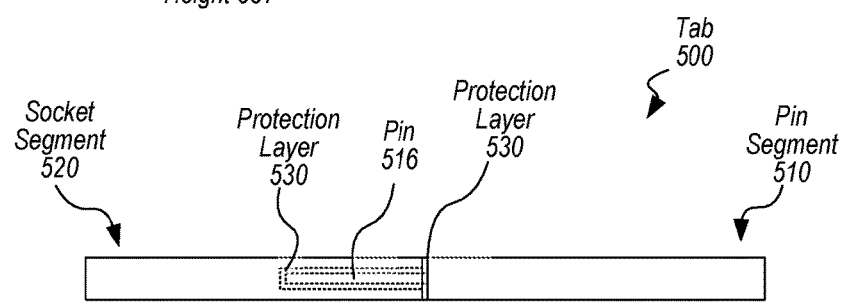

FIGS. 5A and 5B illustrate a bi-metal tab 500 that includes a protection layer applied to surfaces of the pin tab segment 510, where the protection layer separates the pin tab segment 510 and the socket tab segment 520 when the segments 510, 520 are coupled together and is configured to electrically isolate the coupled segments 510, 520 based on exposure to one or more particular physical conditions, according to some embodiments. The tab 500 illustrated in FIGS. 5A and 5B can be included in any of the embodiments of a bi-metal tab herein, including one or more of the tabs 126A and 126B illustrated in FIG. 1.

As shown in FIG. 5A, a protection layer 530 is applied to surfaces of at least the pin structure 516 and portions of the pin outer body 512 that are configured to be in flush contact with one or more socket tab segment 520 surfaces when the segments 510, 520 are coupled together. In some embodiments, a protection layer 530 is applied to one or more surfaces of at least the socket 526 included in the socket tab segment 520. In some embodiments, the dimensions of the pin 516 are less than the corresponding dimensions of the socket 526, so that the protection layer can fit between the socket tab segment 520 and the pin tab segment 510 when the pin 516 is coupled with the socket 526. The protection layer 530 can have dimensions that correspond to a difference between the pin 516 dimensions and the socket 526 dimensions, so that the protection layer 530 forms a connection between the pin 516 and the socket 526 when the pin 526 and the socket 530 are coupled. For example, as shown in FIG. 5A, the total depth 528 of the socket 526 can correspond to the total depth 519 of the pin 516 to that the protection layer 530 is applied, where the depth 518 of the pin alone is less than depth 528 and the additional depth resulting from application of layer 530 to pin 516 results in a layered pin having a depth 519 that corresponds to the depth 528 of socket 526. Similarly, the total height 537 of the socket 526 can correspond to the total height 533 of the pin 516 to that the protection layer 530 is applied, where the height 531 of the pin alone is less than height 537 and the additional height resulting from application of layer 530 to pin 516 results in a layered pin having a height 533 that corresponds to the height 537 of socket 526.

As shown in FIG. 5B, when the layered pin 516 is engaged into the socket 536, the external surface of the layered pin can lie in flush contact with the surfaces of the socket 526, thereby establishing a uniform connection between the segments 510, 520 via at least some of the surfaces of the pin 516 and the socket 526. In some embodiments, the uniform connection is established via an entirety of the surfaces of the pin 516 and the socket 526 when the pin is engaged with the socket 526. The resulting tab 500, shown in FIG. 5B, includes a protection layer that bridges a connection between the separate segments 510, 520. The protection layer can include one or more instances of binder materials that can at least partially adhere the surfaces of pin tab segment 510 to the surfaces of the socket tab segment 520. The protection layer can include one or more instances of active materials that facilitate electronic transport between the separate segments 510, 520.

The protection layer 530 can provide adhesion of segments 510, 520 and can, under regular battery operating conditions, conduct electricity between the segments 510, 520, thereby facilitating electronic transport. Upon exposure to one or more particular physical conditions, the protection layer 530 can at least partially restrict electronic transport across the layer 530, thereby restricting electronic transport between segments 510 and, 520, which can result in shutting down operation of a battery cell to that the tab 500 is coupled. In some embodiments, the layer 530 is isolated from an interior of the battery cell to that tab 500 is coupled. As a result, the layer 530 can be isolated from corruption, degradation, etc. by various materials included in the cell, including various electrolyte substances, thereby augmenting the shut-down functionality and resulting protection provided by the layer 530.

The protection layer can mitigate the effects of a failure, fault, etc. of the cell, one or more conditions that can lead to a failure, fault, etc., by shutting down the cell. In particular, the protection layer can be configured to restrict electronic transport based on exposure to physical conditions that can result from one or more various failures of the battery cell. Such failures can include one or more of excessive current through the cell during charging or discharging, an electrical short, an overcharging state associated with excessive voltage, an excessive discharge state associated with an undervoltage, excessive temperature in the cell, an overheating state of the cell that is associated with one or more temperature values, an overpressure state in the cell, some combination thereof, etc. For example, the one or more conditions can include physical conditions associated with an electrical short of the battery cell, including one or more of temperature, voltage, etc. that exceeds one or more threshold values. Because the protection layer restricts electronic transport based on exposure to one or more of such physical conditions, the protection layer can shut down a battery cell that is experiencing one or more various faults. As a result, the physical effects of such a failure, fault, etc. are mitigated, thereby mitigating the risk of physical damage to elements external to the cell.

In some embodiments, a protection layer can conduct or restrict electronic transport across the layer, based on the physical conditions to that it is exposed, independently of the composition, phase, type, etc. of electrolytes that are present in the battery cell. For example, the protection layer 530 shown in FIGS. 5A and 5B can be comprised of materials that are chemically neutral, inert, etc. with regard to the one or more electrolytes that can be present in the cell to that tab 500 is coupled. In some embodiments, the protection layer 530 is electrochemically neutral. As a result, the protection layer 530 can provide a "shut down" ability for the battery that can be utilized without consideration for the type and composition of electrolytes included in the battery cell, as the protection layer 530 may operate, i.e., conduct or restrict electronic transport, independently of the electrolyte materials included in the cell. The protection layer 530 can thus provide augmented shutdown capability with respect to a battery separator layer as a result of operating independently of the various electrolytes that can be included in the battery cell. The protection layer can thereby provide at least partial shutdown of batteries that include solid electrolyte materials. In addition, the protection layer 530 can restrict electronic transport between separate battery cells via the tab 500 and can provide at least partial shutdown, electrical isolation, etc. between separate battery cells in a battery. The protection layer can thereby provide at least partial shutdown of bipolar batteries.

In some embodiments, the protection layer provides augmented adhesion between the separate segments 510, 520 of the tab 500, reduced contact resistance between the separate segments 510, 520, etc. The protection layer can be comprised of a mixture of various materials, referred to herein as the protection layer material, where at least some of the protection layer material comprises materials that provide various functions of the protection layer. The protection layer material can include one or more binder materials that provide adhesion by the protection layer between the separate tab segments 510, 520. A binder material can include one or more of CMC, PVDF, Acrylic binders, some combination thereof, etc. The protection layer material can include one or more conductive materials, also referred to herein as active materials, that are electrically conductive and therefore at least partially facilitate electronic transport across the protection layer. Conductive materials can include one or more of carbon black materials, carbon nanotube materials, silver materials, etc. The protection layer material can include one or more thermally-activated binder materials that are activated based on the temperature of the binder materials exceeding one or more threshold temperatures.

In some embodiments, a protection layer, to restrict electronic transport across the layer based on exposure of the layer to one or more physical conditions, changes from being an electrically conductive layer to being an electrically insulating layer based on exposure to the one or more physical conditions. Physical conditions can include one or more of a temperature of at least the protection layer, a voltage of at least the protection layer, some combination thereof, etc. For example, a protection layer can change to an electrically insulating layer, thereby shutting down a battery cell, in response to exposure of at least a portion of the layer to a temperature that exceeds one or more threshold temperature values, that can include one or more of a high temperature threshold, a low temperature threshold, some combination thereof, etc. Exposure of at least one portion of a protection layer to a physical condition that comprises at least a particular temperature can include exposure of the at least one portion of the protection layer to a physical condition that causes the temperature of the at least one portion of the protection layer to be at least the particular temperature. Exposure of at least one portion of a protection layer to a physical condition that comprises at least a particular temperature can include the temperature of the at least one portion of the protection layer being at least the particular temperature. Exposure of at least one portion of a protection layer to a physical condition that comprises at least a particular voltage can include exposure of the at least one portion of the protection layer to a physical condition that causes the voltage across the at least one portion of the protection layer to be at least the particular voltage. Exposure of at least one portion of a protection layer to a physical condition that comprises at least a particular voltage can include the voltage across the at least one portion of the protection layer being at least the particular voltage.

To change from being electrically conductive to being electrically insulating, the protection layer can be comprised of one or more materials that, in response to exposure to one or more particular physical conditions, including one or more physical conditions that exceed one or more threshold values, change state to an electrically insulating state. Such materials are referred to herein as "protection materials". A protection material, upon changing state to an electrically insulating state, can overcome conductivity of one or more active materials included in the protection layer, thereby rendering the protection layer as an electrically insulating layer. The change in state can be irreversible, such that the battery cell is permanently shut down. In some embodiments, the change in state is reversible, such that the battery cell can be re-started upon physical conditions to that the protection layer is exposed being within one or more threshold value ranges.

A change of state of a protection material in the protection layer can include a change in molecular structure of the material within the layer, including polymerization of the material, depolymerization, decomposition, some combination thereof, etc. A change of state of a material in the protection layer can include a change in phase of the material within the layer including the material changing from a solid to a gas phase. A change of state of a material can include a combination of a change in molecular structure and a change in phase; for example, a material can, based on a local temperature of the material, decompose into one or more different substances that are in a different phase, which can result in outgassing from the material within the layer. Where a material changes molecular structure, composition, phase, some combination thereof, etc., the resulting one or more materials, in the one or more resulting phases, can be electrically insulating and can, in some embodiments, overcome one or more electrically conductive materials in the protection layer such that the protection layer becomes electrically insulating. Such overcoming of conductive materials can include the resulting one or more insulating materials terminating some or all electrically conductive pathways through the protection layer.

In some embodiments, a protection layer comprises various protection materials that each change to an electrically insulating state in response to different physical conditions. A protection layer can comprise a mixture of multiple different materials, where one or more materials change to an electrically insulating state in response to a local temperature of the material exceeding a particular threshold value and one or more different materials change to an electrically insulating state in response to a local voltage exceeding a particular threshold value and one or more different materials change to an electrically insulating state in response to the local voltage exceeding a different particular threshold value.

For example, a protection layer can include a protection material that is stable within a certain range of exposed temperatures, including a range from −40 degrees Celsius to +80 degrees Celsius, and changes state to an electrically insulating state upon exposure to a temperature beyond that range. Such a material can include one or more various polymers, additives, some combination thereof, etc., including, for example, $Li_2CO_3$. Such a protection material can respond to exposure to a physical condition beyond a certain range or threshold value by changing state, including expanding, decomposing, generating gases, some combination thereof, etc. In some embodiments, a protection layer includes a protection material that is stable when exposed to a temperature that is below a certain threshold temperature and changes state to an electrically insulating state upon exposure to a temperature above that certain threshold temperature. In some embodiments, a protection layer includes a protection material that is stable when exposed to a temperature that is above a certain threshold temperature and changes state to an electrically insulating state upon exposure to a temperature below that certain threshold temperature.

In another example, a protection layer can include a protection material that is stable within a certain range of exposed operating voltages, including a range from 3.0 volts to 4.4 volts, and changes state to an electrically insulating state upon exposure to a voltage beyond that range. Such a material can include one or more various substances, additives, some combination thereof, etc., including, for example, Biphenyl. Such a protection material can respond to exposure to a physical condition beyond a certain range or threshold value by changing state, including expanding, decomposing, generating gases, some combination thereof, etc. In some embodiments, a protection layer includes a protection material that is stable when exposed to an operating voltage that is below a certain threshold operating voltage and changes state to an electrically insulating state upon exposure to a voltage above that certain threshold operating voltage. In some embodiments, a protection layer includes a protection material that is stable when exposed to an operating voltage that is above a certain threshold operating voltage and changes state to an electrically insulating state upon exposure to a voltage below that certain threshold operating voltage.

A protection layer can comprise a mixture of various protection materials, some of that are configured to change to an electrically insulating state based on exposure to different sets of one or more physical conditions. Protection materials that change to an electrically insulating state in response to one or more physical conditions can be included in one or more "additive" materials that can be included in the mixture of materials comprising the protection layer material. In some embodiments, the additive materials comprise a minority portion of the mixture of materials comprising the protection layer material. For example, a protection layer can be comprised of a mixture of one or more additive materials, where each additive material comprises approximately 5-10% of the mixture by one or more of mass, volume, etc. In another example, a protection layer can be comprised of a mixture of one or more additive materials that collectively comprise approximately 5-10% of the mixture by one or more of mass, volume, etc. In another example, a protection layer can be comprised of a mixture of one or more additive materials, where each additive material comprises approximately 5-10% of the mixture by one or more of mass, volume, etc., one or more binder materials that comprise approximately 5-10% of the mixture by one or more of mass, volume, etc., and mixture of one or more active materials that comprise a remainder of the mixture by one or more of mass, volume, etc. In some embodiments, the protection layer comprises a slurry of various materials, including one or more active materials, protection materials, binder materials, etc. that is applied to one or more surfaces of one or more layers of a battery cell to form the protection layer.

In some embodiments, the protection layer 530 comprises a mixture of one or more protection materials, as described above, that are configured to change to an electrically insulating state based on at least some of the protection layer 530 being exposed to one or more physical conditions, that can include physical conditions that exceed one or more physical condition thresholds. As a result, the protection layer 530 can, based on at least the layer 530 being exposed to one or more particular physical conditions, restrict electronic transport through the tab 500, and therefore between a terminal of a battery cell and an exterior of the cell. Such restricting of electronic transport can result in a shutting down of discharging, charging, etc. of a battery cell, which can mitigate a catastrophic failure of a battery that could result in physical damage to an exterior environment that is external to the battery.

Figure 6A:
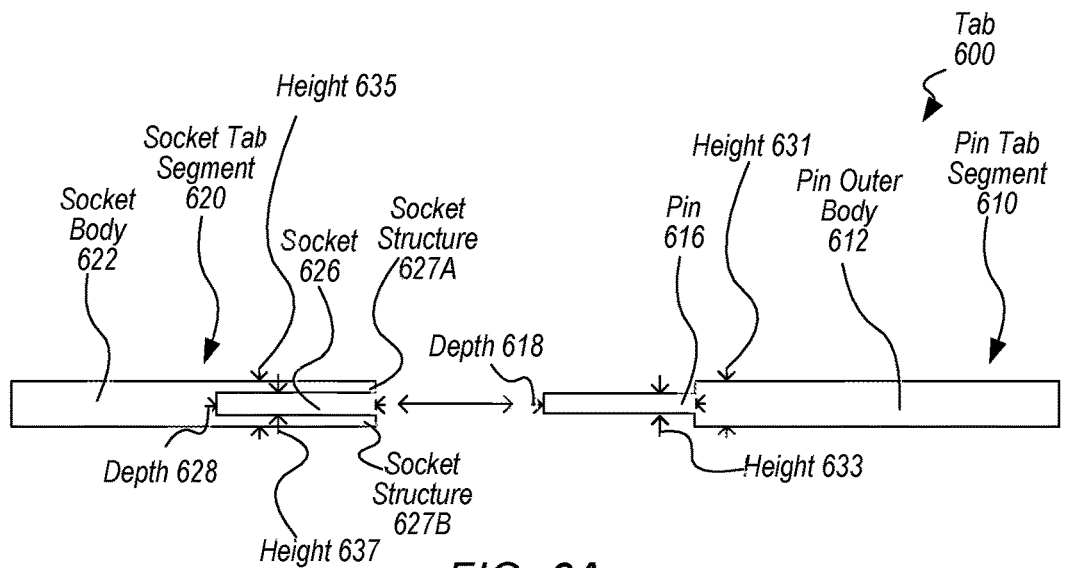
FIGS. 6A-C illustrate a bi-metal tab that includes a pin tab segment and a socket tab segment configured to couple so that at least one surface of the pin structure remains exposed, according to some embodiments.
Figure 6B:
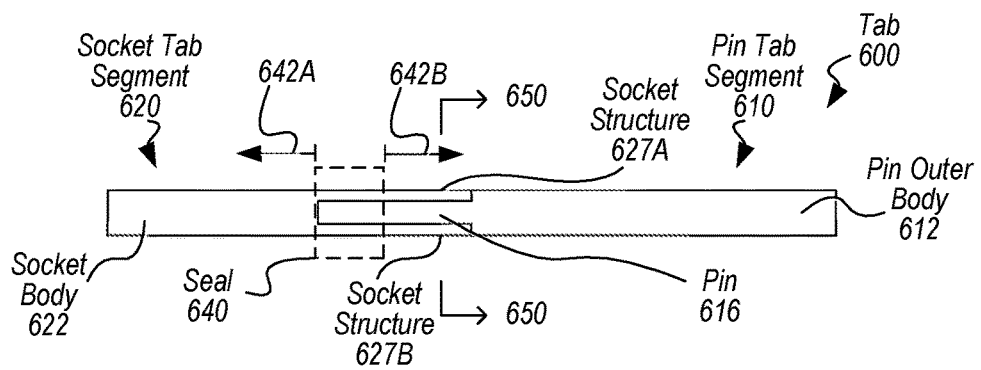
Figure 6C:
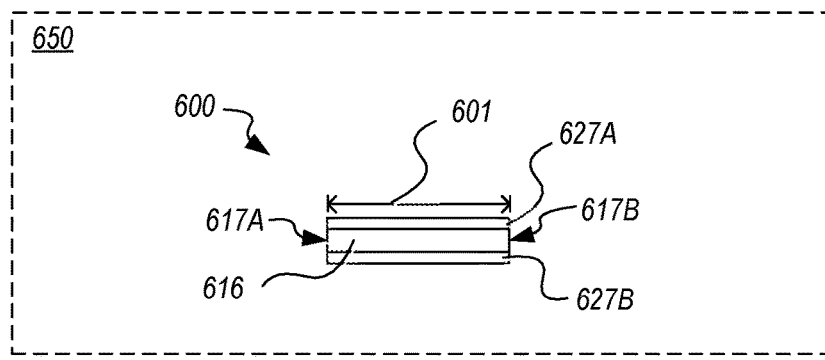

In some embodiments, a pin structure included in a pin tab segment extends along an entirety of at least one dimension of the pin, so that the pin is at least partially exposed when the pin is coupled to a corresponding socket of a corresponding socket tab segment. FIGS. 6A-6C illustrate a bi-metal tab 600 that includes a pin tab segment 610 and a socket tab segment 620, according to some embodiments. As shown in cross-sectional view 650 illustrated in FIG. 6C, the pin tab segment 610 extends along a width 601, and the pin structure 616 included in the segment 610 extends along a common width 601 as the outer body 612 of the pin tab segment.

The corresponding socket tab segment 620 includes a corresponding socket 626 that extends along a common width 601 as the outer body 622 of the socket tab segment 620. The socket 626 and the pin 616, in some embodiments, extend along a common width 601. As shown in FIG. 6A, the socket 626 is bounded on two opposite sides by socket walls 627A and 627B. Because the socket 626 extends along the same length of width dimension 601 as the socket outer body 622, the docket 626 is unbounded on two opposite sides that are orthogonal to the sides bounded by walls 627A and 627B.

As further shown in FIG. 6A, the height 633 of pin 616 can correspond to the height 637 of socket 626, and the depth 628 of socket 626 can correspond to the depth 618 of pin 616, so that the socket 626 is configured to couple with the pin 616 in a flush fit, and the pin 616 is configured to couple with the socket 626 in a flush fit. The height 631 of the pin outer body 612 can correspond to the height 635 of the socket outer body 622, so that the tab 600 includes a flush outer surface when the segments 610, 620 are coupled in a flush fit between the pin 616 and the socket 626.

As shown in FIGS. 6B-6C, when the pin tab segment 610 and the socket tab segment 620 are coupled, via engagement, insertion, etc. of the pin 616 into the socket 626, at least one surface 617 of the pin 616 is exposed to an exterior environment of the tab 600. As shown, because the width of the pin 616, the socket 626, and the outer bodies 612, 622 are common, and the sides of the socket 626 on opposite sides of the width 601 of the segment 622 are unbounded by socket walls 627A and 627B, the opposite side surfaces 617A and 617B of the pin remain exposed when pin 616 is inserted into socket 626, while surfaces of pin 6161 that are orthogonal to surfaces 617A and 617B are bounded by socket walls 627A and 627B, to that the orthogonal surfaces are coupled extends along a common width 601 as the outer body. As a result, the tab 600 is configured to facilitate electronic coupling across the surfaces of the pin 616 that are engaged in contact with the socket tab segment 622.

As shown in FIG. 6B, tab 600 can include a seal 640 that is coupled to the tab 600 so that the seal 640 extends around the exterior of the tab 600 and separates the exposed portions of the tab into two portions 642A and 642B that are separated by the seal 640. The seal can be incorporated into an exterior surface of a battery cell, so that the seal 610 isolates one portion 642 that is internal to the battery cell from another portion 642 that is external to the battery cell. In some embodiments, where the pin tab segment 610 is comprised of an external metal material and the socket tab segment 620 is comprised of an internal metal material, the seal 640 is coupled to the tab 600 at a position that isolates any exposed portion of pin tab segment 610, including the exposed surfaces 617A and 617B of pin 616, from being included in a portion 642A that is configured to be included in an interior of a battery cell. For example, as shown in FIG. 6B, the seal 640 is coupled to the tab 600 at a position that separates the tab 600 into a portion 642A that includes the exposed material of segment 620 and a separate portion 642B that includes the exposed materials of both segments 610 and 620. The illustrated configuration of seal 640 can be implemented where the pin tab segment 610 is comprised of an external metal material and the socket tab segment 620 is comprised of an internal metal material, as the illustrated configuration of seal 640 isolates the external material comprising segment 610 from being exposed in at least one isolated portion, 642A, that can be included in the interior of a battery cell. In some embodiments, where the socket tab segment 620 is comprise do internal metal material, the seal 640 can be coupled to the tab 600 in a configuration that separates the exposed portions of the tab 600 into a portion 642A that includes exposed surfaces of segments 610, 620 and is configured to be included on an exterior of a battery cell and an isolated portion 642B that includes exposed surfaces of segment 610 and is configured to be included in an exterior of a battery cell, where the exposed surfaces of segment 620 are isolated from portion 642B.

Those skilled in the art will appreciate that a number of techniques may be used to fabricate a battery, including a lithium battery that includes at least one bi-metal tab according to any of the embodiments included herein. In some embodiments, a battery that is configured to at least partially suppress electronic transport through one or more battery cells, between one or more battery cells and one or more portions of a battery, etc. based on one or more physical conditions at a protection layer included in one or more bi-metal tabs included in one or more battery cells, can be at least partially fabricated via various techniques. One or more various processes for fabrication of a bi-metal tab can be implemented, as shown and described below.

Figure 7:
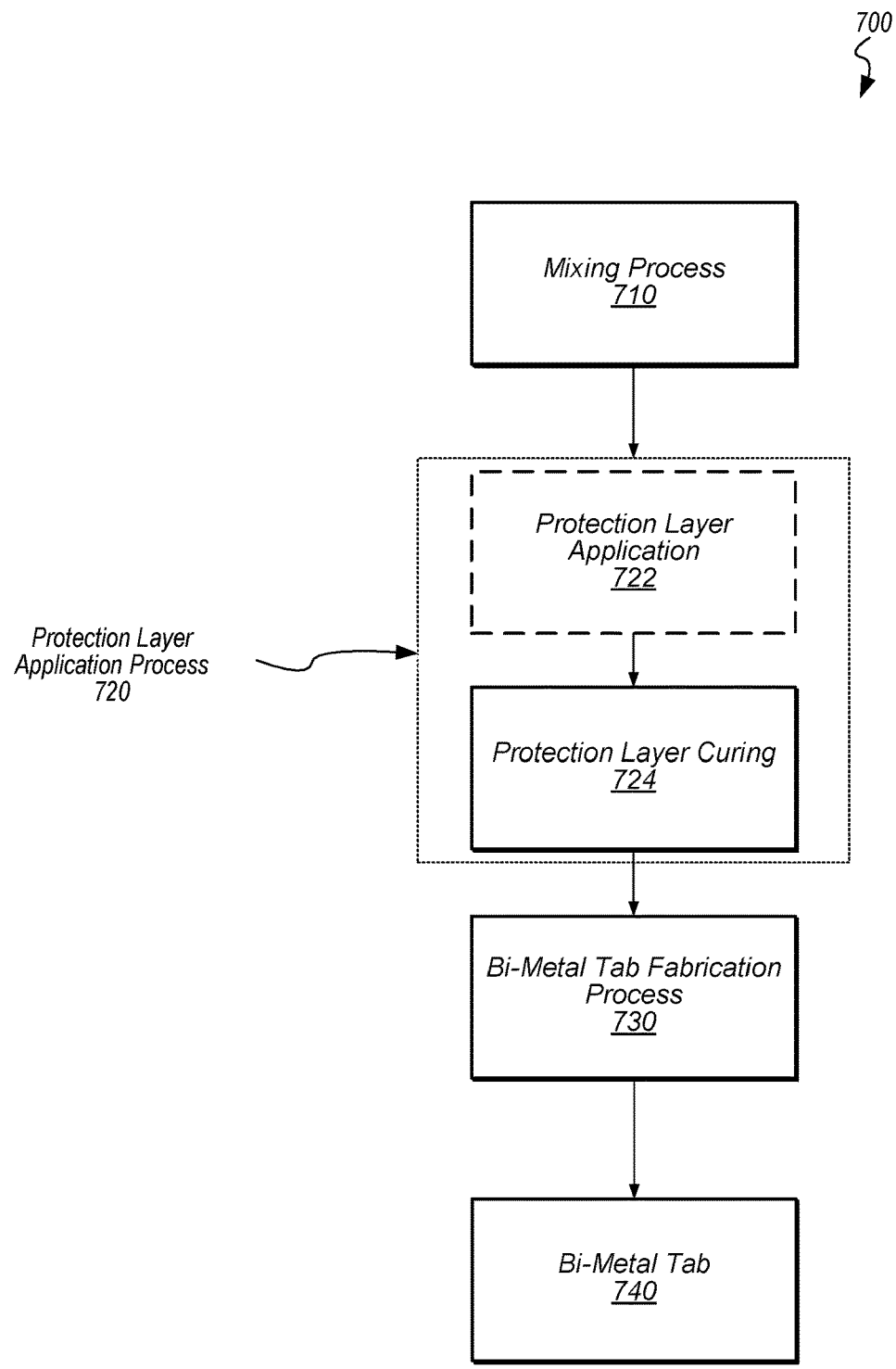
FIG. 7 illustrates a fabrication system configured to fabricate a bi-metal tab, according to some embodiments.

FIG. 7 illustrates a fabrication system configured to fabricate a bi-metal tab, according to some embodiments. The fabricating can be controlled by one or more computer systems, which are described further below.

The system 700 can include a mixing process 710 where various protection layer materials are received and mixed to form a protection layer material that is applied to one or more surfaces of one or more tab segment. A pin tab segment and a socket tab segment, and one or more protection layers can be applied at step 722 to one or more surfaces of one or more of the segments pin tab and socket tab segments.

Each separate segment can be comprised of a separate metal material, where one material is configured to resist corrosion in an interior of a battery cell and is referred to as the internal metal. A segment that is comprised of the internal metal can be referred to as the internal tab segment, and the other segment, which can be comprised of a separate metal material can be referred to as the external tab segment. In some embodiments, the pin tab segment is the internal tab segment and the socket tab segment is the external tab segment. In some embodiments, the pin tab segment is the external tab segment and the socket tab segment is the internal tab segment.

Process 720 can include applying a protection layer to one or more surfaces of one or more of a pin tab segment and a socket tab segment. The process 720 can further include curing 724 the applied one or more layers.

The protection layer material formed in process 710 can include a mixture of a particular selection of the protection layer materials received at the process 710. The mixture can include a slurry mixture that is formed via a slurry mixing process comprised within process 710. In some embodiments, the layer applied at 722 can include multiple protection layers, and some protection layers can include separate protection layers that are comprised of different sets of materials and are configured to respond differently to different physical conditions. Processes 710-720 can be controlled by one or more computer systems via one or more communication links. In some embodiments, separate processes 710-720 are controlled by separate computer systems via separate communication links.

In some embodiments, one or more sets of protection layer materials used to form one or more components of one or more protection layers are provided to mixing process 710 as material stock, including a power stock, liquid stock, gaseous stock. At least some of the material can be provided as bulk material that is mixed, in separate amounts, in process 710 to form one or more batches of protection layer material that is provided, in one or more processes 720, to form one or more protection layers on one or more surfaces of one or more of a pin segment and a socket segment.

The protection layer materials provided to the mixing process 710 can include on or more active materials, also referred to as conductive materials, that can facilitate electronic transport, one or more binder materials, and one or more protection materials that are configured to change state based at least in part upon being exposed to one or more physical conditions. Multiple different protection materials can be received, and one or more of the received materials can be mixed together, in process 710, to form a protection layer material that can be provided to processes 720 to form a protection layer that can restrict electronic transport based on the layer being exposed to one or more different physical conditions. For example, one material that is received can include a material, including $Li_2CO_3$ that changes state to an electrically-insulating state in response to being exposed to a physical condition that causes a temperature of the material to exceed one or more thresholds, including a temperature that is beyond a particular range or "window" of temperature values. In another example, one material that is received can include a material, including Biphenyl, that changes state to an electrically-insulating state in response to being exposed to a voltage that exceeds one or more thresholds, including a voltage that is beyond a particular range or "window" of voltage values.

The above protection layer materials, in some embodiments, can be mixed together in process 710 to form a mixture that, when applied in processes 720 to form one or more protection layers, form one or more protection layers that can at least partially restrict electronic transport across the layer in response to one or more of temperature or voltage within, across, etc. the one or more protection layers exceeding one or more threshold values. In some embodiments, separate materials can be mixed into separate mixtures that are provided to processes to form different protection layers; for example, $Li_2CO_3$ can be mixed into a first mixture that is provided to process 720 to form a first protection layer and Biphenyl can be mixed into a second mixture that is provided to process 720 to form a second protection layer.

In some embodiments, one or more protection layer materials formed at process 710 are provided to protection layer application process 720 to form one or more protection layers on one or more surfaces of one or more tab segments. Such application processes can result in a layer that includes multiple protection layers that are applied to different surfaces of one or more of the tab segments, multiple protection layers applied in sequence to one or more particular surfaces of one or more tab segments, some combination thereof, etc. For example, a particular protection layer material can be applied to one or more surfaces of a pin included in the pin tab segment, and a separate protection layer material can be applied to one or more surfaces of a socket included in the socket tab segment. As a result, the multiple protection layers can be applied separately in separate application processes.

At 730, a bi-metal tab 740 is fabricated from coupling at least one pin tab segment and at least one socket tab segment. The coupling can include inserting a pin included in the pin tab segment into a socket included in the socket tab segment, securing the pin in the socket via one or more known bi-metal bonding processes, coupling a seal structure to a portion of the bi-metal tab that separates the tab 740 into two separate portions, where the internal metal material is absent from being exposed on one of the separate portions.

Figure 8:
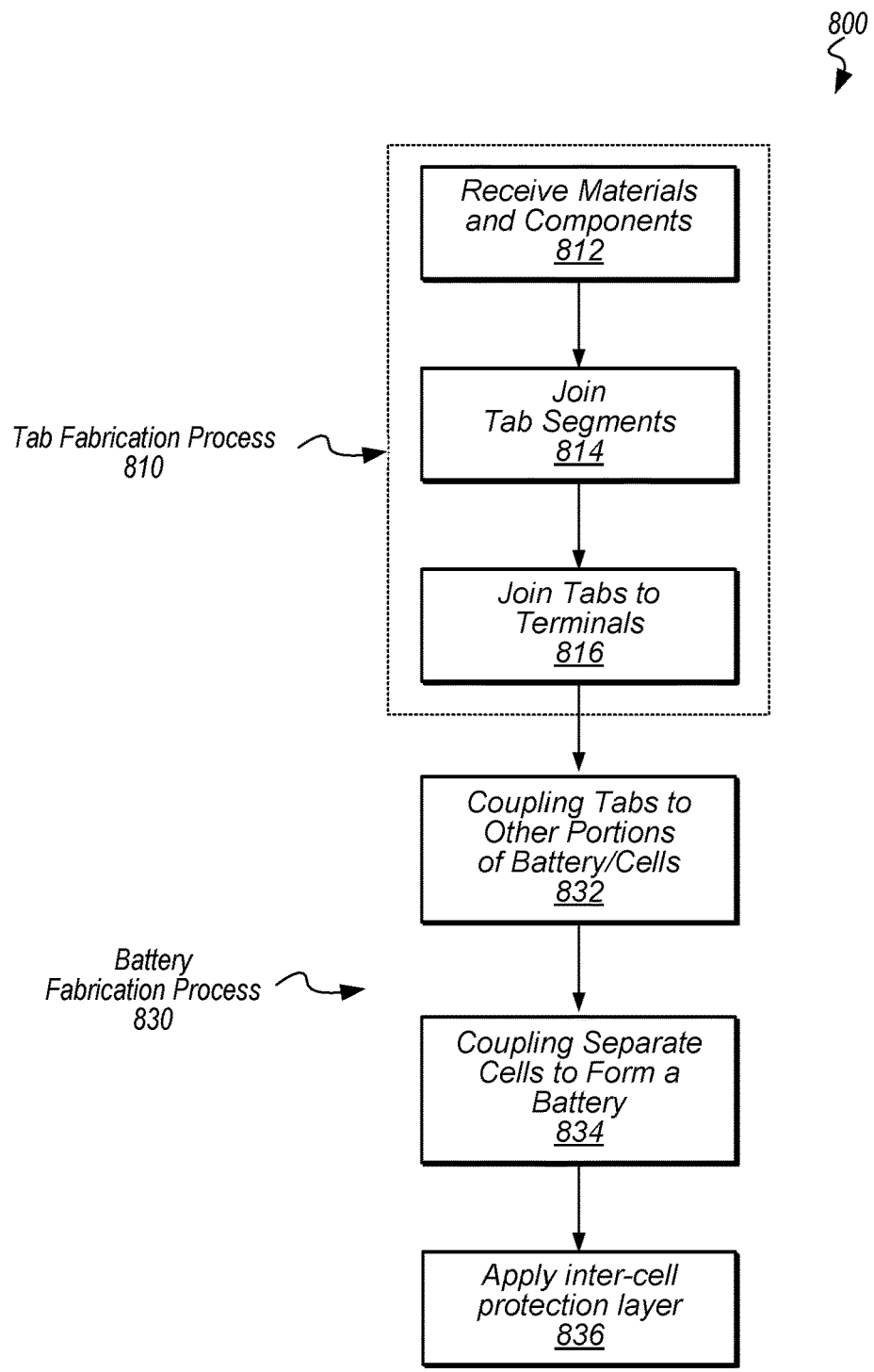
FIG. 8 illustrates a fabrication system configured to fabricate a battery, according to some embodiments.

FIG. 8 illustrates a fabrication system 800 configured to fabricate a battery, according to some embodiments. The fabricating can be controlled by one or more computer systems, which are described further below.

A set of battery components are received into a battery cell fabrication process at step 812, where the components are assembled to form one or more battery cells. Battery components can include one or more bi-metal tabs. Battery components can also include one or more battery electrode layers, collector layers, battery separator layers, and electrolyte materials. In some embodiments, one or more of the current collector layers comprises a foil layer coupled to a terminal. In some embodiments, one or more of the bi-metal tabs includes one or more of the tabs 740 fabricated in the processes shown in FIG. 7. The electrolyte materials can include one or more of a solid electrolyte layer, a liquid electrolyte material, some combination thereof, etc. It will be understood that various other materials can be received into the battery cell fabrication process 810.

In some embodiments, fabrication process 810 includes coupling or joining one or more tab segments together to form a bi-metal tab at step 814. Coupling or joining one or more tab segments together may include, for example, positioning a pin segment at least partially within a socket segment and joining the pin segment with the socket segment, for example by lamination, press-fitting, or any other suitable coupling method as will be apparent to one having ordinary skill in the art. In some examples of cell fabrication process 810, one or more protection layers may be applied to one or more of various surfaces of tabs or tab segments.

Some embodiments include coupling one or more bi-metal tabs to one or more terminals included in one or more current collectors, at step 816. Coupling a bi-metal tab to a terminal can include one or more of coupling an internal portion of the bi-metal tab to a portion of the terminal, coupling a battery cell seal to a portion of the tab that separates the external portion of the tab from the interior of a battery cell in that the portion of the terminal is included, etc.

In some embodiments, one or more of the battery components is received as a complete layer that can be applied, in the process 810, to at least partially assemble a battery cell via stacking the complete layer onto another layer. For example, the current collectors can be received as complete current collector layers, each comprising a particular amount of foil layer coupled to a terminal, which can be applied to an electrode layer, including a cathode layer, that is received as an electrode material, such that process 810 does not include forming the separate electrode layer and current collector. In some embodiments, one or more of the battery components are obtained as a set of materials that can be used to form one or more layers of the battery as part of process 810. For example, one or more of the electrode materials can be received as a roll of layer material that can be cut, segmented, partitioned, etc. as part of the fabrication process 810 to form an individual electrode layer for an individual battery cell. In another example, the electrolyte material of an electrolyte layer, including LiPON, one or more additional materials, including PVDF binders, CMC binders, Acrylic binders, etc., can be obtained as a mass of material stock that can be applied to one or more surfaces, that can include a surface of one or more other layers of the battery cell, as described further below, to form one or more electrolyte layers. In some embodiments, obtaining the electrode materials includes obtaining an anode material that is used to form one or more anodes of the battery, where the anode material comprises lithium metal.

The battery cell fabrication process 810, which can be controlled by computer via a communication link, produces one or more battery cells as an output, based on fabricating the cells from the components received into the process 810. As further shown, the one or more cells can be received into a battery fabrication process 830, which can be controlled by one or more computers via one or more communication links, and which fabricates a battery from at least the battery cells. For example, process 830 can include assembling separate battery cells into a symmetrical configuration of the cells to form a battery, for example at step 834. In some embodiments, process 830 includes applying one or more protection layers between cells within a battery (step 836) as an input into the process, where the fabrication of the battery includes applying a protection layer to a foil layer of at least one battery cell and coupling the battery cell to another battery cell, so that the protection layer lies between foil layers of the separate cells. In some embodiments, the fabrication process 830 produces a bipolar battery.

The fabrication process 830 can include coupling an external portion of one or more bi-metal tabs included in a battery cell to one or more other portions of the battery at step 832. For example, where the battery includes a bus bar, fabrication 830 can include coupling one or more bi-metal tabs included in a battery cell to the bus bar, which can result in electrically coupling at least one terminal of the battery cell to one or more various portions of the battery.

Processes 810 and 830, in some embodiments, are controlled by separate computers via separate communication links.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, for example, plural instances may be provided for components described herein as a single instance. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A battery, comprising:
    a conductive tab fixed to the battery and in electrical communication with a battery cell terminal of a battery cell of the battery, the conductive tab positioned partially external to the battery cell, the conductive tab comprising:
        a socket segment composed at least in part of a first metal; and
        a pin segment composed at least in part of a second metal, the pin segment comprising a pin surface positioned at least partially within the socket segment and in contact with at least a first socket wall of the socket segment,
    wherein the conductive tab is configured to electrically connect the battery to an external component to provide power from the battery, and wherein the conductive tab including the socket segment and the pin segment remain fixed to the battery when the battery is not connected to the external component.

2. The battery of claim 1, further comprising a seal positioned at a boundary of an internal portion of the battery cell, the seal positioned about a portion of the conductive tab.

3. The battery of claim 1, further comprising a seal positioned about a portion of the conductive tab, the seal at least partially covering a joint between the socket segment and the pin segment.

4. The battery of claim 1, further comprising a protection layer in contact with at least a portion of the pin surface and at least a portion of the first socket wall, the protection layer positioned between the pin surface and the first socket wall.

5. The battery of claim 4, wherein the protection layer is configured to, in response to exposure of the protection layer to one or more physical conditions, at least partially inhibit electrical transmission within the battery.

6. The battery of claim 1, further comprising a protection layer in contact with at least a portion of the pin surface and at least a portion of a second socket wall of the socket segment.

7. The battery of claim 1, wherein the socket segment and pin segment are laminated together.

8. The battery of claim 1, wherein no portion of the pin segment is exposed within the battery cell.

9. The battery of claim 1, wherein the second metal is aluminum.

10. The battery of claim 1, wherein the first metal is either copper or nickel.

11. A method, comprising:
    at least partially fabricating a battery, the at least partially fabricating the battery comprising:
        fabricating a conductive tab fixed to the battery and in electrical communication with a battery cell terminal of a battery cell of the battery, the conductive tab comprising:
            a socket segment composed at least in part of a first metal; and
            a pin segment composed at least in part of a second metal, the pin segment positioned at least partially external to the battery cell, the pin segment comprising a pin surface positioned at least partially within the socket segment and in contact with at least a portion of a socket wall of the socket segment,
        wherein the conductive tab is configured to electrically connect the battery to an external component to provide power from the battery, and wherein the conductive tab including the socket segment and the pin segment remain fixed to the battery when the battery is not connected to the external component.

12. The method of claim 11, further comprising joining the socket segment and the pin segment by lamination.

13. The method of claim 11 further comprising joining the socket segment and the pin segment by press-fitting.

14. The method of claim 11, further comprising fabricating a seal positioned at a boundary of an internal portion of the battery cell, the seal positioned about a portion of the conductive tab.

15. The method of claim 11, further comprising fabricating a protection layer in contact with at least a portion of the pin surface and at least a portion of the socket wall, the protection layer positioned between the pin surface and the socket wall.

16. The method of claim 15, wherein the protection layer is configured to, in response to exposure of the protection layer to one or more physical conditions, at least partially inhibit electrical transmission within the battery.

17. The method of claim 16, wherein the one or more particular physical conditions comprise one or more of:
    a temperature condition;
    a voltage condition;
    a current condition; and
    a pressure condition.

18. The method of claim 11, further comprising fabricating a protection layer in contact with at least a portion of the socket segment external the socket wall and at least a portion of the pin segment.

19. A portable electronic device, comprising:
    at least one functional component configured to consume electrical power; and
    a battery configured to provide electrical power support to the at least one functional component, the battery comprising a battery cell and a conductive tab fixed to the battery, the conductive tab comprising:
        a socket segment composed at least in part of a first metal; and
        a pin segment composed at least in part of a second metal, the pin segment positioned at least partially external to the battery cell, the pin segment comprising a pin surface positioned at least partially within the socket segment and in contact with at least a first socket wall of the socket segment,
    wherein the conductive tab is configured to electrically connect the battery to the at least one functional component to provide power from the battery, and wherein the conductive tab including the socket segment and the pin segment remain fixed to the battery when the battery is not connected to the at least one functional component.

20. The portable electronic device of claim 19, wherein the battery further comprises a seal positioned at a boundary of an internal portion of the battery cell, the seal positioned about at least a portion of the conductive tab.

* * * * *